Figure 1:
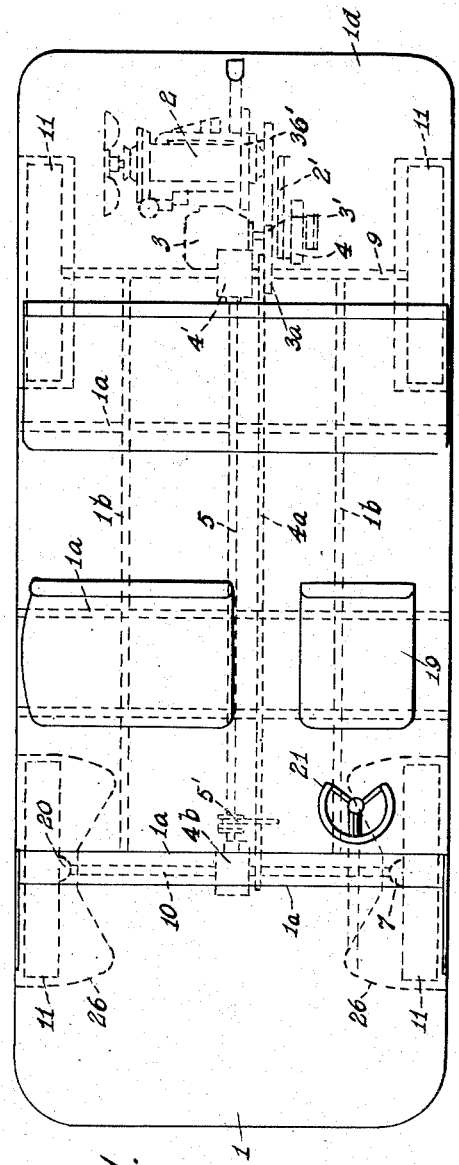

April 5, 1955  J. V. MARTIN  2,705,539
MOTOR VEHICLE

Filed Nov. 1, 1948  8 Sheets-Sheet 1

INVENTOR.
James V. Martin

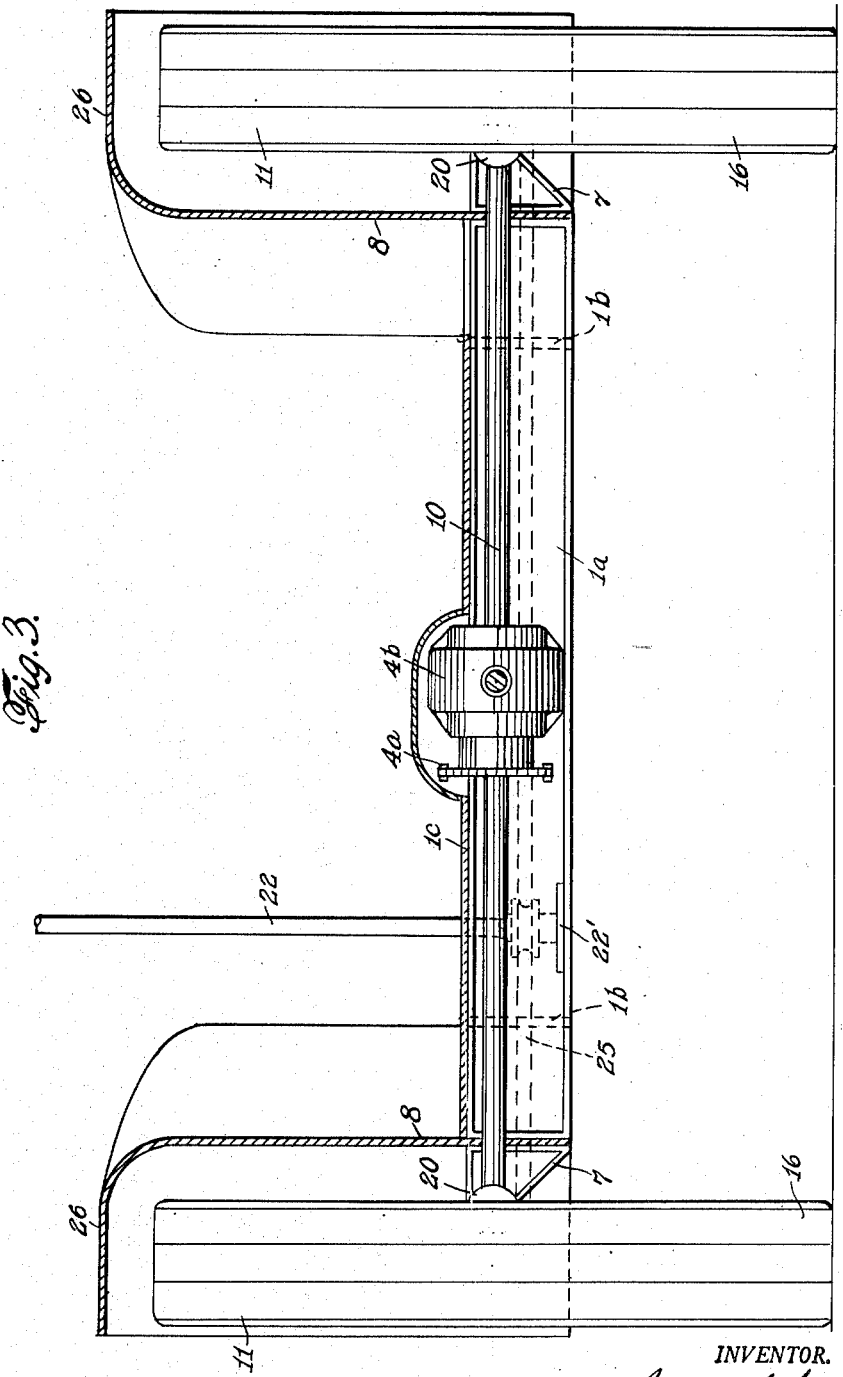

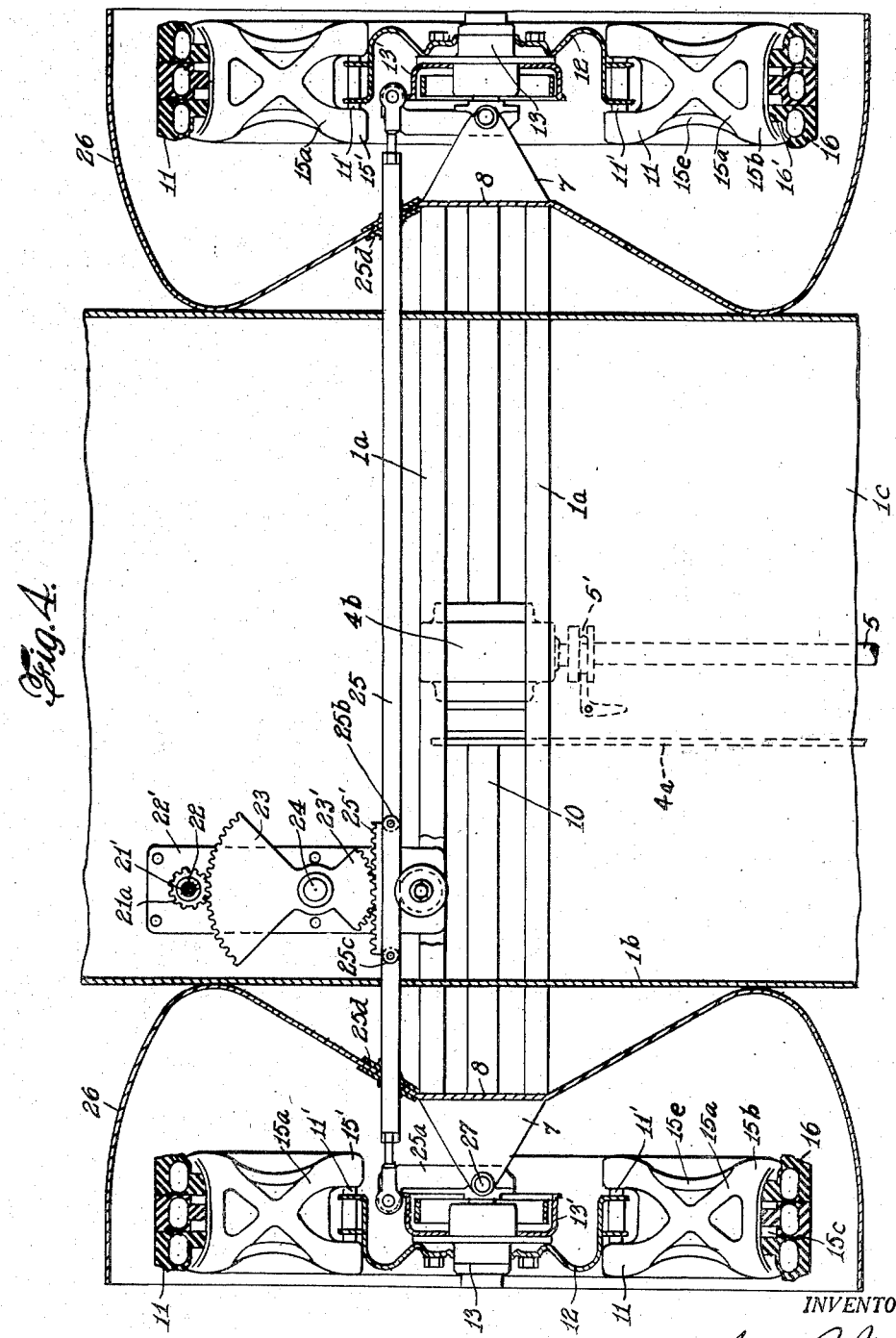

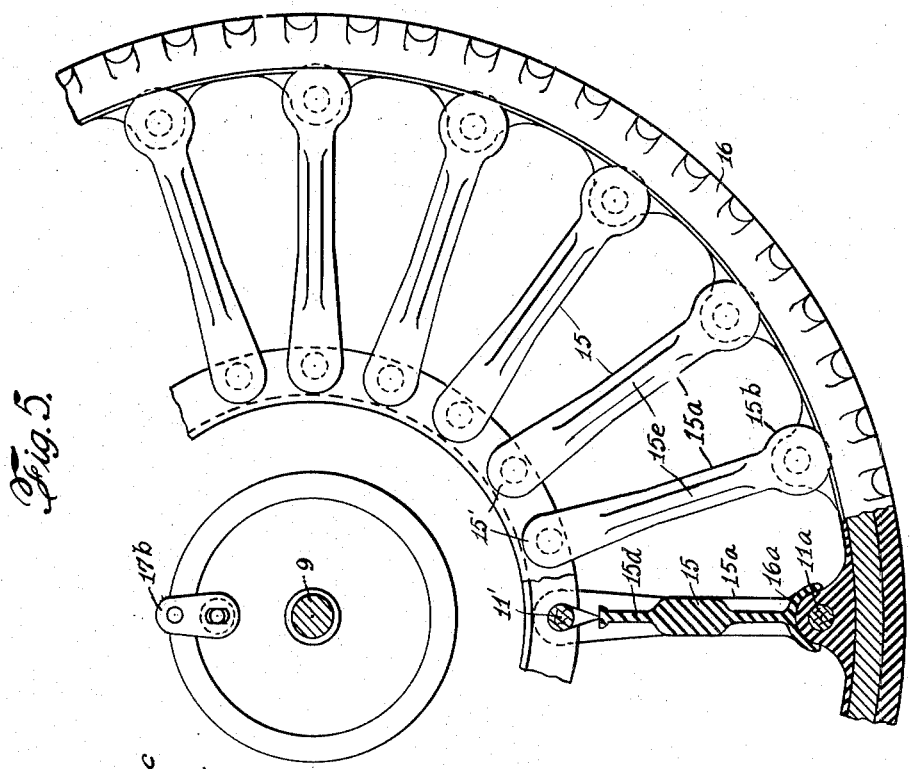
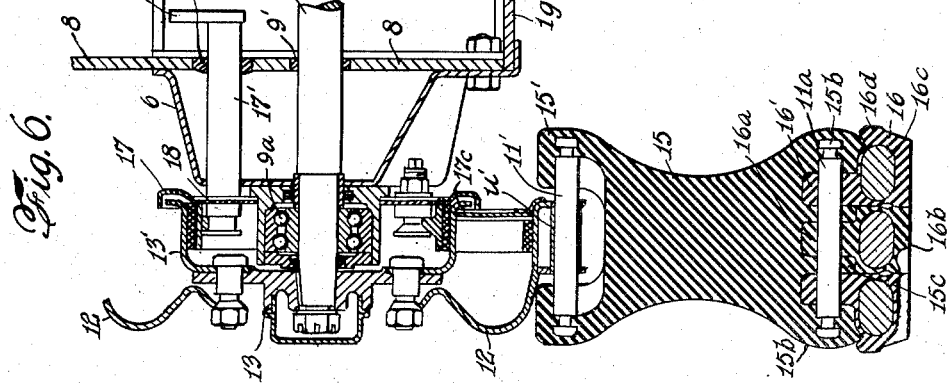

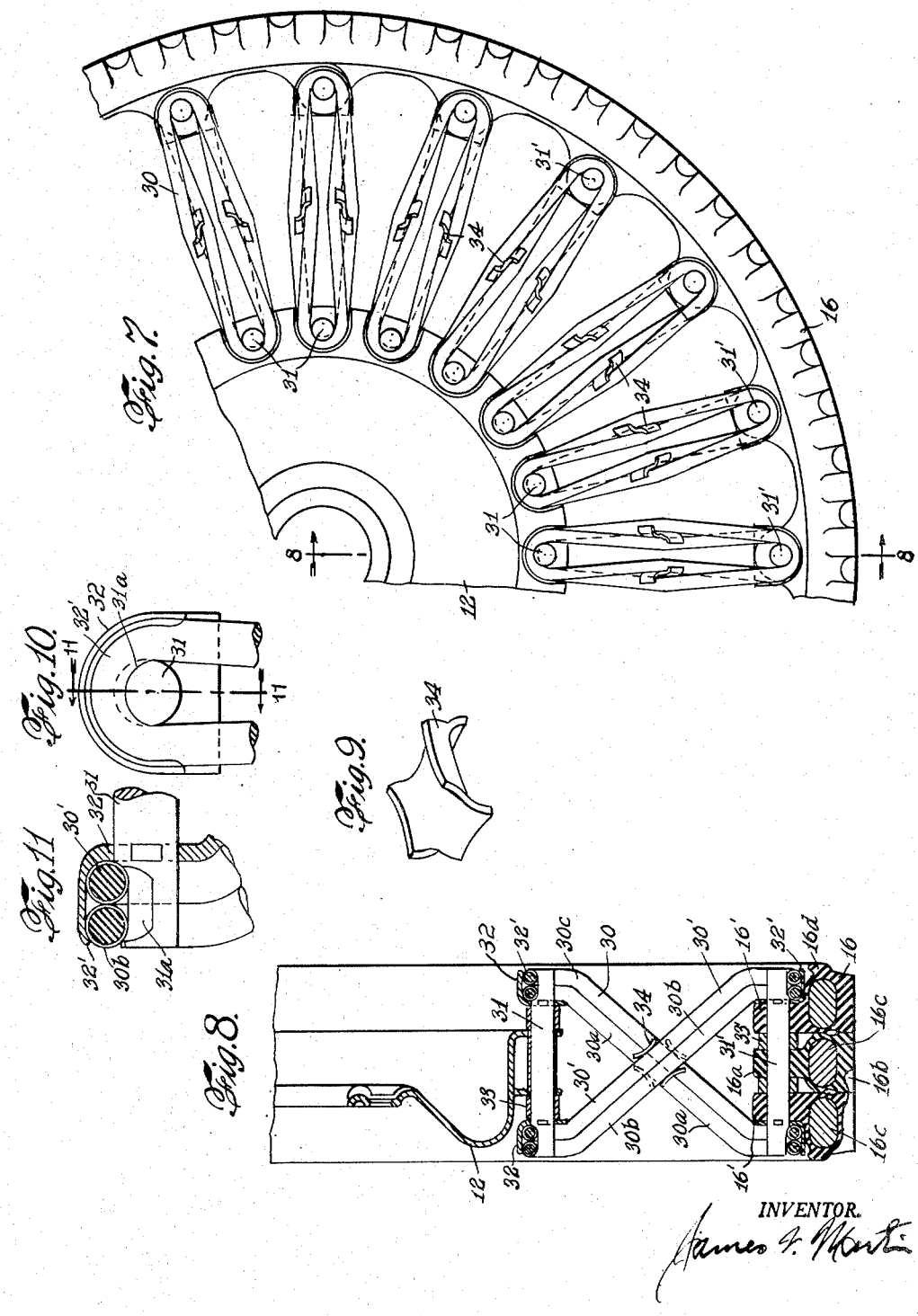

April 5, 1955

J. V. MARTIN 2,705,539

MOTOR VEHICLE

Filed Nov. 1, 1948

8 Sheets-Sheet 6

INVENTOR.
James V. Martin

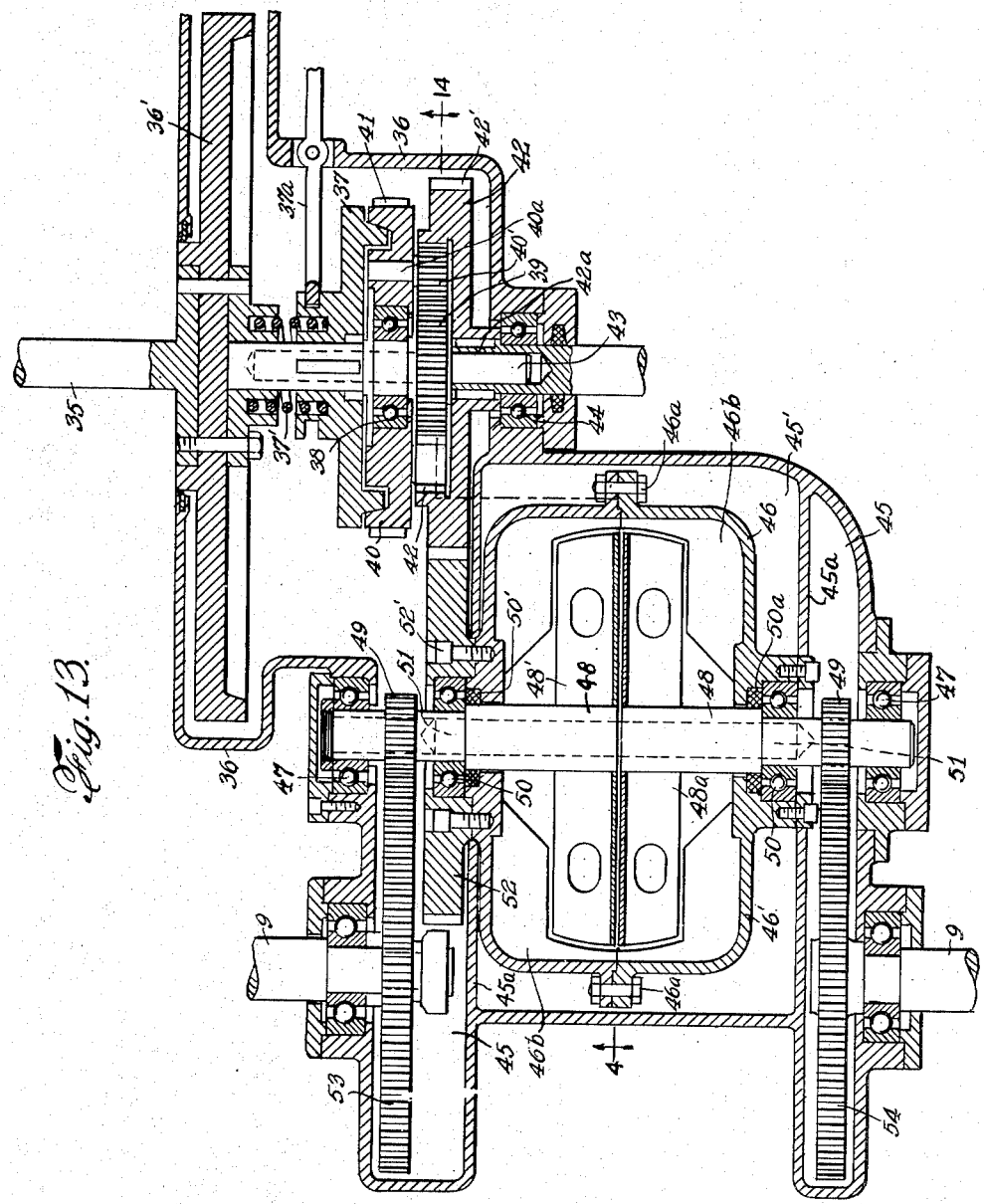

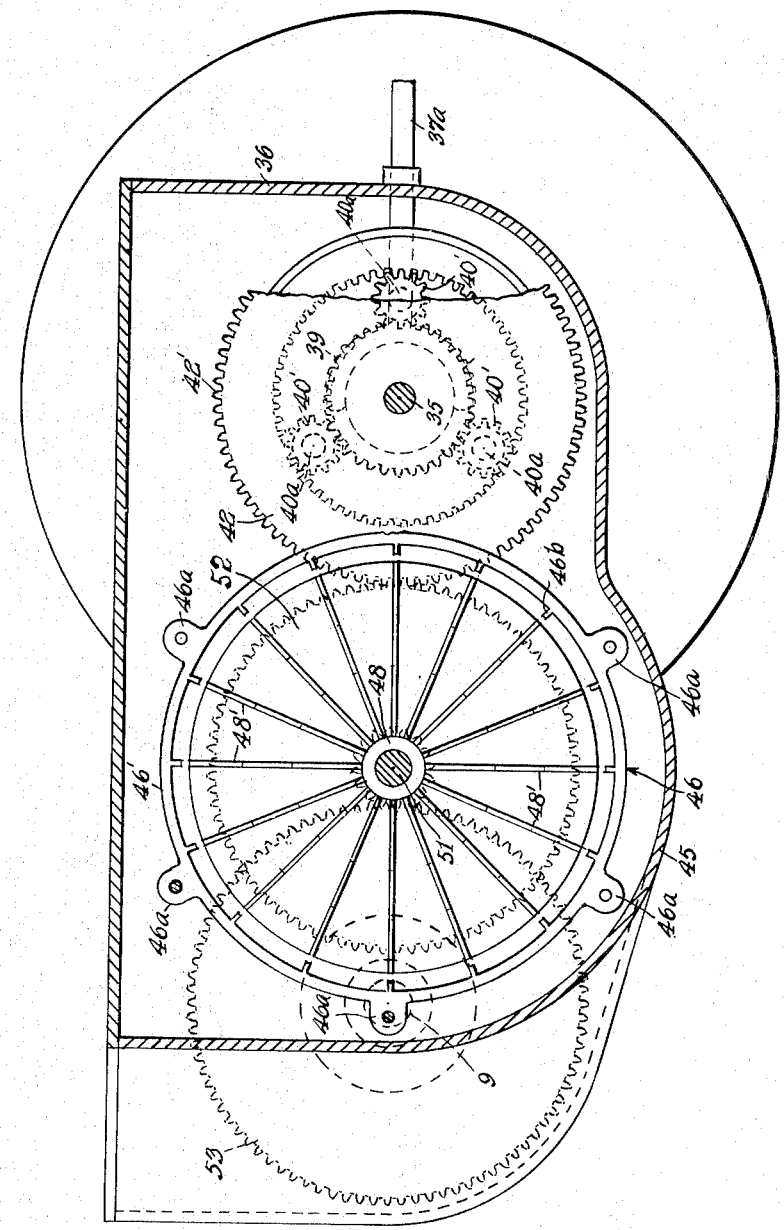

… … …

United States Patent Office 2,705,539
Patented Apr. 5, 1955

2,705,539
MOTOR VEHICLE
James V. Martin, Camptown, Pa.

Application November 1, 1948, Serial No. 57,751

7 Claims. (Cl. 180—44)

My invention relates to motor vehicles and is exemplified in an amphibious type vehicle. The primary object of my invention is to provide an increased range and better quality springing for vehicles and to make this improved range and quality of springing apply to all parts of the vehicle alike.

Roadability experts, the world over, have recognized the detrimental effect of the unsprung weights of a vehicle upon the sprung portions thereof and the patent art of the world shows thousands of efforts to transfer as much as possible of the unsprung category to the sprung classification. The practical results of the combined efforts of inventors over a period of fifty years can be seen in today's conventional automobile. It is the object of this invention to provide a better type of vehicle suspension than any presently known, To understand the present invention it is necessary to compare its long range of vertical springing adjacent the ground with the 2 to 4 inches of steel spring action and about 1 inch of pneumatic tire movement of the conventional automobile. The excessive side sway in conventional automobiles incident to the twist of the steel springs and the fact that the steel springing does not benefit many important auto parts such as the differential and rear housing, axles, wheels, bearings, hubs, brakes and steering tie-rod should also be noted. The steel springs themselves are unsprung weight imposing dynamic loads upon the above unsprung automobile parts, while the bouncing characteristics of the pneumatic tires store up harmful momentum. Lack of sufficient lateral strength appears to be the limiting factor for vertical range of springing in both steel springs and the inflated type tires. Another outstanding accomplishment of this invention is the springing of all automobile parts by means of an ample and equal range of down movement from static load thus permitting a differential fluid drive to avoid the difficulty of transferring two different rotational velocities from the sprung to the unsprung portions of an automobile as would be necessary if one applied a differential fluid drive to a conventional automobile.

As secondary objects of the invention I wish to mention simplification of the vehicle structure and lowering the center of gravity relative the wheel spindles or stub-axles and the arrangement of wheel brackets adapted to take road stresses and brake torque stresses directly into the box-like sill of the vehicle body.

Further objects and features of my invention will become apparent from the following description taken in connection with the accompanying drawings and the appended claims.

Figure 2:
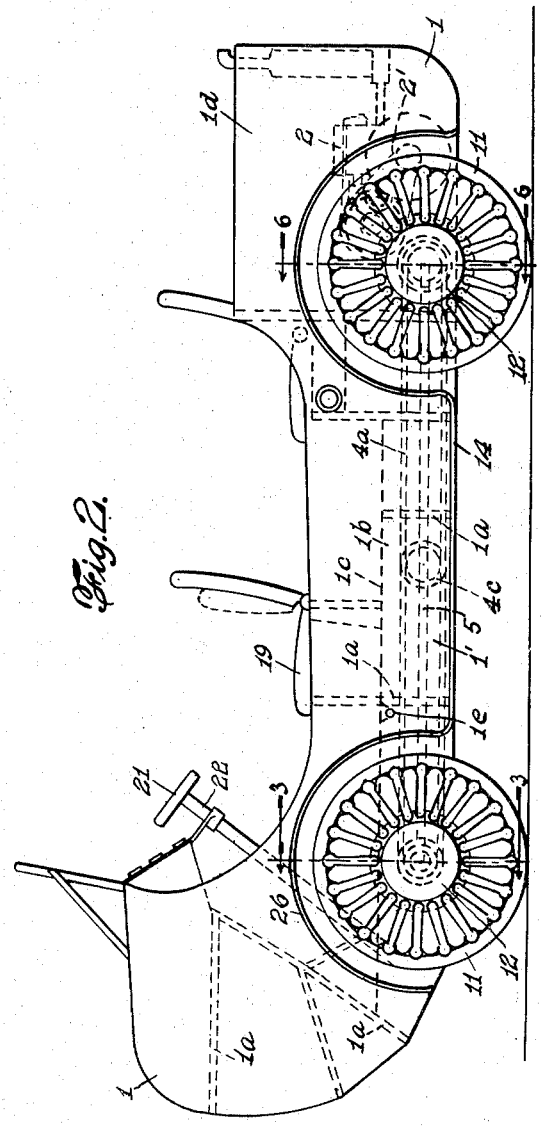

Fig. 1 is a plan view of self bailing, duck type jeep, chosen as a smaller type vehicle to exemplify my invention, Fig. 2 is a side elevational view of the vehicle shown in Fig. 1, Fig. 3 is a vertical sectional view taken approximately on the line 3—3 of Fig. 2, Fig. 4 is a view, partly in section, looking down on the forward drive and steering parts of the vehicle, Fig. 5 is a side elevation showing one of my rear drive wheels and tires.

Figures 12, 15:
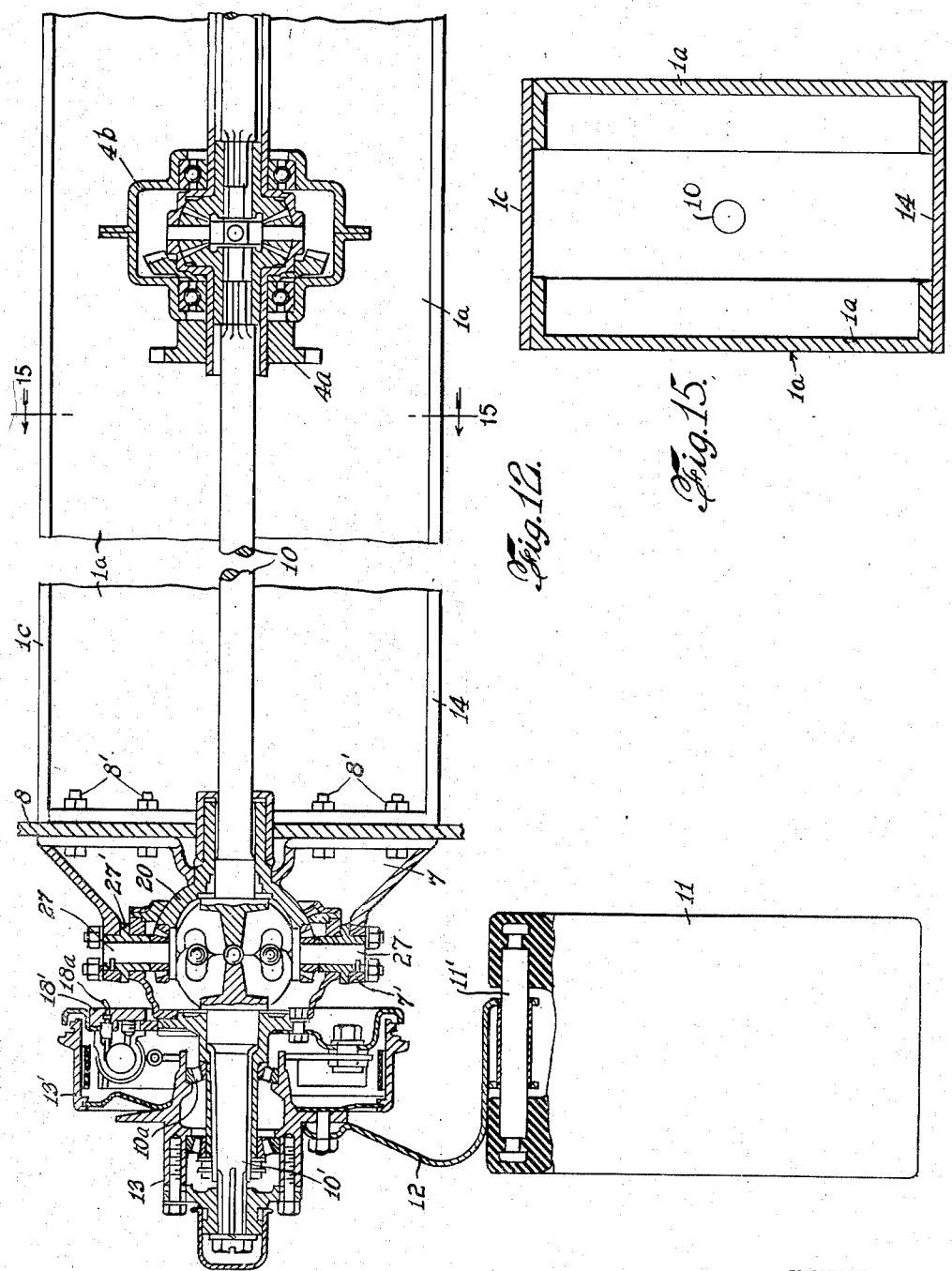

Fig. 6 is a view, partly in section, showing the rear drive wheel bracket assembly, Fig. 7 is a side elevational view of an alternative or elastic cord tire, and Fig. 8 is a view, partly in section, taken along the line 8—8 of Fig. 7, Fig. 9 is a perspective view of the separator I employ to prevent chafing of the cords shown in Figs. 7 and 8, Fig. 10 is a fragmentary view showing the wheel connection end attachment of the cords, and Fig. 11 is a view, partly in section, taken along the line 11—11 of Fig. 10, Fig. 12 is a more detailed view showing the steering and driving means taken in substantially the same view as Fig. 3, Fig. 13 is a plan view of my fluid differential coupling,
Fig. 14 is a view taken along the lines 14—14 of Fig. 13, but omitting certain walls as, for example, the flywheel housing, and Fig. 15 is a view taken along the line 15—15 of Fig. 12.

Proceeding to the more detailed description of the invention similar numerals will designate similar parts throughout the several views.

1 indicates the double bottomed "duck-jeep" embodiment of my invention; and 1' is the buoyant, sealed tight, portion of the vehicle with transverse channels 1a providing bracing and bulkheads for 1'. In Figs. 1 and 2 I also show fore and aft box type bracing 1b which together with 1a supports the floor 1c. The only open part of the buoyant sub-body 1' is the rear motor compartment 1d, in which the "in-line" motor 2 is disposed transversely of the direction of travel and behind the rear drive wheel's drive shafts. This eliminates the need for the usual bevel gear right angle drive.

2' indicates a double link chain drive from the motor 2 to the three speed and reverse (motorcycle type) transmission gear box 3. A clutch 4 connects the gear box drive, by a single chain 3', to a sprocket 3a on the rear differential drive 4'.

In Figs. 1, 2, 3 and 4 I show, as alternative drives, a chain 4a and the conventional drive shaft 5 to carry the drive from the conventional differential 4' to the corresponding mechanism 4b, mounted securely to the sub-body transverse brace 1a. 5' indicates a clutch, see Figs. 1 and 4, to engage the front wheel drive with the drive shaft 5.

An idler sprocket 4c can be used to support the center of the chain 4a. The drive shaft 5 if used in preference to the chain does not require a universal joint as found in conventional practice because I spring the drive shaft weight along with differentials, bearings, wheels, brakes etc. by my novel elastic spoke tire. Note should be taken of the wheel assembly brackets 6 for the rear and 7 for the front drive wheels of my vehicle. These are braced for all stresses by box-like truss 1a Fig. 15.

For example see the end union of channels 1a with bracket 7, via bolts 8' in the wall 8 of the vehicle. Similar tie-up for strength is seen in Fig. 6, where the channels 1a are bolted through wall 8 to bracket 6. Note wall 8 in Fig. 4 is part of the indenture of 26. 1g is a strength tie-in between wall 8 and the automobile bottom 14, see Fig. 6.

These brackets take the brake torque and road stresses directly into the side wall 8 of the body, thus relieving the drive shafts 9 rear, and 10 forward from stresses such as conventional practice induces and hence my drive shafts and differentials can be proportionately reduced in size.

The casing formed by channels 1a and surrounding the front drive shaft 10 can be an integral part of the sub-body bracing of my type vehicle (see Fig. 15) thus saving weight by performing double functions, due to my placing all the range and quality of car springing in one place, namely in my novel elastic spoke tires 11. These tires are mounted on disc wheels 12 which are demountably attached according to conventional practice to the hub 13. This hub carries brake drum 13'. Cross-bars 11' are press fitted into the U shaped rim portion of wheels 12 and fitting snugly over the ends of these cross-bars are the socket filled ends 15' of rubber tire spokes 15. These tire spokes differ materially from previous showings of the elastic tire spokes, see Patent Nos. 2,016,095; 2,050,352; 2,235,378; 2,298,142; 2,492,433 and 2,634,816.

Among the important differences my spokes in the present invention are considerably longer in vertical assembled dimension than they are wide and the cross ribs 15a terminate in the present case in a spoke lug 15b enlarged at the expense of its inner spoke lug 15c. Also to accommodate this change, which increases the lateral strength of the tire, the tread hoop lug 16' on the outermost tread hoops 16 is shifted from former practice at the centers of the hoops to the inner parts of the hoops, see Fig. 6. 16b indicates my center hoop with usual stiffening filler 16c.

It will be seen that my spokes have comparatively small inwardly disposed lugs 15c and larger outwardly disposed lugs 15b, which form the locking connections to tread hoop lugs 16' and 16a. Those skilled in the art will understand that the spaces seen in Fig. 5 between the lugs 15b along the tread hoops can accommodate the relaxed and folded spokes when fully compressed between the wheel rim tubular sleeve U' and tread hoop 16.

Those skilled in the art will realize that to attain the comparable range of down movement from static load of four inches of steel spring movement plus one inch of inflated tire movement I have had to elongate my spoke, as assembled to the wheel 12 so that in its stretched condition it is longer radially than the wheel radius, see Figs. 2, 4 and 5.

The elongated spoke has a configuration, see Figs. 4 and 5, wherein the cross ribs 15a carry a greater proportion of the total spoke loads further toward the lateral portions 15b than was possible in former showings and this transfers some of the almost purely vertical stresses in the spokes of former showings to the cross ribs ends, near the tread hoops and, note should be taken that in the cross ribs the lateral strength of my tire resides. All of the cross ribs in the tire must be stretched in order to laterally displace the tread of the tire relative the wheel U rim. The webs 15d and the beads 15e of the tire spokes function as per prior disclosures. Note also that the cross-bars 11' and 11a are identical in shape and this improvement toward lightness and standardization is accomplished by the tubular sleeve U', which gives cantilever strength to the ends of the cross-bars 11', holding their centers from buckling.

In order to prevent wear of my tire spokes where they are secured around the lock bars 11a and contact with the tread hoop lugs 16' and 16a I mold the cavities for reception of the lockpins smaller than the lock-pin itself, thus producing rubber pressure enough to stop surging. Also the respective lugs are molded oversize so that, when held tightly together by the button headed lock pins or lock-bars 11' they prevent surging. Attention is called to my Patent No. 2,693,215 of November 2, 1954.

Note should be taken in Fig. 6 of the watertight seal 9' which prevents water from entering the body and the brake 17, operably mounted on the back-plate 18, has an actuating shaft 17' with a water seal 17a and a lever 17b, located within the water tight compartment of the vehicle. The brake 17 is closed to water by a seal 17c, see Fig. 6. I show double row ball bearings 9a sealed against water for the wheels 12.

The front end of my vehicle is unique in several ways, the sealed tight bottom 14 portion is carried around under and forward of the driver's seat providing enough buoyancy so that the vehicle can dive into a river or lake at a comparatively great angle and never-the-less not submerge. Such water as splashes into the passenger compartment will automatically run out through the scuppers 1e since the buoyant compartment is given enough cubic dimension to more than float the gross weight of my vehicle. In cases where the "duck" adaptation of my vehicle can be dispensed with I advise raising the bottom 14 of the vehicle as much as possible so that the drive shafts, steering gear, etc. are protected from road dust and thus increasing the road clearance over that of a "duck-jeep," and also I advise lowering the driver's seat 19, the passenger foot floor 1c, and passenger seats to lower the center of gravity and at the same time preserve a smooth under bottom portion 14 of the vehicle, so that in soft mud the bottom will not allow the vehicle to sink so deeply and also so that there will be no protrusions to prevent easy sliding movement of the vehicle body on top of mud or deep snow.

The front end of my invention also provides a combination of front wheel drive and simplified steering means for the wheels, see Figs. 3, 4 and 12. A sealed tight type of well known universal joint 20 is located at the ends of front drive shaft 10, while the steering hand wheel 21 turns a steel tube 21' held in an external casing 22. A floor bracket 22' provides a lower bushing for the said tube 21' and just above said bushing is a pinion 21a in meshed tooth engagement with a gear segment 23 journaled to turn about 24. Said gear segment 23 extends as a plate beyond the said journal 24 to another oppositely disposed gear segment 23' in engagement with a rack 25' attached to a steering tie-rod 25.

This tie-rod does not move up and down relative to the body and steering column as is conventional practice, but is as fully sprung as is every other part of my vehicle by my long spoke tire and therefore a very simple water seal 25d suffices for the thwartship motion of the tie rod ends. This seal is located in a novel form of wheel housing 26 made to accommodate the steering movements of the front wheels, but indentured at its inner center part so as to provide foot room for the auto driver in seat 19.

It will be noticed that both the front wheel drive shaft 10 and the steering tie-rod 25, see Figs. 3 and 4 are directly under the floor 1c and feet of the driver and, since my long spoke tires provide all the vehicle springing these parts 10 and 25 do not require space for vertical spring movement as they do in conventional practice. Furthermore the transverse bracing adjacent the drive shaft 10 carries the box-like base of the vehicle see Fig. 15 out toward the wheel center much further than a conventional wheel housing would permit thus lowering the stresses on the front wheel brackets 7 and providing in the extending side wall 8 of the body a firm support for the universal joint drive for the front wheel.

The steering tie-rod 25 is extremely simple being pivoted to oscillate slightly and in one plane only at 25b and 25c and leading to the Ackerman tie-rod lever 25a. In this vehicle member 25 acts not only as the steering wheel tie-rod but also acts as the steering means joining the steering tie-rod 25 operatively to the brake backplate 18' which turns the steering wheels about a king pin 27 over and under the driving universal joint 20.

Here again one can find fundamental differences between conventional practice and this invention. I employ what is known as a constant velocity universal joint 20 to drive my steering wheels, but unlike conventional construction my rigid union of body structure with the brackets 7 which control the angles for the king-pin 27, wheel, brakes etc., do not require the usual wheel camber nor its consequent toe-in and make caster angle entirely unnecessary. A vehicle wheel should run true and straight in the direction the vehicle is traveling (excepting on turns) and my simplified construction, see Fig. 12, brings the king-pin 27 axis very close to the vertical wheel center and well within the inner supporting margins of my elastic spoke tires.

Numerous beneficial results flow from this improvement, among them should be listed complete elimination of shimmy, which is partly a function of an unsprung tie-rod. The unsprung tie-rod affords even tire wear and easier and steadier steering with reduced stresses on the spindle bolts and reduced side sway and vastly reduced unsprung momentum.

Note that by varying the radius arms from pivot 24 of the arcs 23 and 23' any desired steering ratio can be obtained. Note also that plain instead of ball-socket bearings can be used at the ends of tie-rod levers 25a and at journals 25b and 25c. This arrangement of front wheel steering, whether with or without front wheel drive permits the power unit of the vehicle to be conveniently located to rear of the rear drive shaft allowing the driver to ride comfortably directly over the front drive and tie-rod with ample foot room due to the outwardly indentured wheel housings 26 adjacent the steering column. No longer, with the introduction of this invention, will it be necessary to place the passenger seats between the front and rear wheel axles to obtain easy riding and the wheel loading of the vehicle will even be more uniform, since when only one or two are riding, they usually ride forward, leaving the rear of the conventional car without the weight of either passengers or motor. This is especially bad for high speed road driving since traction must then be had for driving on the lightly loaded rear wheels.

Referring to Fig. 12 shaft 10 drives a steering spindle 10' which is also a drive shaft 10' rotating within roller bearings 10a; and it will be observed that the splined end of drive spindle 10' drives the hub 13 in a well known manner and with said hub brake drum 13'. The universal joint 20 centered between the top king-pin 27 and bottom king-pin 27 has bushings 27' which allow the king-pin to turn through steering angles within the outer bracket arms 7' of bracket 7, thus the back-plate 18' is given its steering angle by the tie-rod lever 25a, see Fig. 4, as controlled by the tie-rod 25. The journalled portion 25c being movable about the king pin 27 and the back plate and brake operating means, herein shown as hydraulic, partaking of the said steering movement, but not, of course rotating with the hub 13 portion. A flexible hydraulic connection indicated at 18a can connect the braking means with control in a well known manner from within the vehicle.

Thus it will be seen that the brake torque is absorbed directly into the indentured wheel housing wall 8 from the bracket 7 at points along the body wall 8 which are braced against warping by through-wall connections 8' with channels 1a which are stress connected with floor 1c on top and with the top of sealed duck compartment 1c if sub-bottom is used. When a "jeep" without 1c is used then the lower connection for channels 1a will be connected on their bottoms with smooth vehicle bottom 14.

The transversely positioned box-like section shown in Fig. 15 is contemplated as an integral part of each body sill between road wheels whether driving or steering wheels.

Referring now to Figs. 7 to 11 inclusive I disclose an alternative to elastic spokes, namely pre-tensioned aviator cords 30, comprising multiple rubber threads tightly bound together and kept under initial tension by two plies of braiding in well known manner and more fully described in my former patents mentioned above.

In Figs. 7, 8 and 11 I show the aviator cord made up as complete loops 30' and 30a, 30b and 30c in pairs occupying a somewhat analogous position in my tire to that of the cross ribs 15a in spokes 15. There are important differences however, for one thing the cords 30 constitute the entire yieldable connection between the wheel 12 and the tread hoops 16 and 16b, without webs, beads or lugs. Furthermore the rubber of the braided cords 30 is tensioned when fabricated into cords and also again when assembled around the plastic pins 31, which are press fitted into the U shaped rim of 12; and 31' which locks the lugs 16' and 16a to the loops 30, see Fig. 8. It will be noticed that 31 and 31' lie inwardly of curbing bead 16d. Also note that both 31 and 31' are rounded at 31a, see Figs. 10 and 11, so that they provide a continuously rounded contact for cords 30 and retain same in place along with overlip 32' of plastic guard 32. This guard serves as a smooth polished surface to prevent contact and chafing of the cord's outer braiding on either the lugs 16' or the spacers 33 around 31. Other spacers 33' are around 31' and a plastic separator 34 prevents contact between the cord loops 30 where they cross each other diagonally. A loop 30a which is the outside of two cords near the tread hoops will be the inside loop around lock pin 31 near the U-rim of wheel 12. There is a compactness and beneficial lateral strength increase in arranging double cord loops rather than use of single loops as shown in my Patent No. 1,954,214 and the arrangement enables me to use either the elastic rubber spokes 15 or the loops 30 with the same tread hoops 16 and 16b.

Referring to Figs. 13 and 14 I show the preferred form of differential drive for my invention. 35 designates the power delivery end or crank-shaft of a typical, in line, engine 2 arranged in the vehicle as shown in Figs. 1 and 2, excepting that the control of the speeds of the auto and its differential action are so simplified that such controls and differential are shown as built into one complete power unit and drive with the motor 2. 36 represents the typical flywheel housing for the engine 2 and 36' the flywheel, which can have the usual starter gear, not shown, at its periphery. The extension of the housing 36 carries a planatary group of gears and a single clutch 37 splined to rotate with the prolonged crankshaft 35, which in my simplified drive invention continues through a ball bearing 38 and terminates where it is secured to a sun gear 39. On the outer race of ball bearing 38 is mounted pinion carrier 40 which is capable of being held against rotation by an external brake 41 applied in a well known manner through a hand lever. Pinions 40' are rotatably mounted on shafts 40a. The pinions 40' mesh with the internal teeth of ring gear 42 which is provided with external teeth 42'. The ring gear 42 rotates and is centered for rotation by a short pilot shaft 43, on a sleeve 42a journalled within ball bearing 44 supported in place by flywheel housing 36. I provide a spring 37' adapted to keep the cone clutch 37 in driving engagement with pinion carrier 40 and I provide a lever 37a, actuated from the driver's seat by suitable push and pull rods, to either hold the clutch 37 against the spring 37' in disengagement from gear carrier 40 or to alternatively either leave the brake 41 free of engagement with pinion carrier 40 or to set the said brake 41 while holding clutch 37 in disengagement with carrier 40.

An extension 45 of housing 36 provides a housing for my fluid differential fluid coupling 46. This consists primarily of an inner housing 46', bolted together in two halves at 46a and rotatably mounted in ball bearings 47 held by the housing 45, which is mounted as a unit along with the motor 2 and housing 36, to the sub-body of the vehicle.

The bearings 47 are outside of sleeves 48 and 48 are splined at their ends to drive pinions 49 and these sleeves lie within the inner race of ball bearings 50, on the outer race of which the walls 46' of my fluid drive 46 are mounted for free rotation about said sleeve 48. It will be noticed that I provide a separation chamber of air 45' to keep 46 free from contact with the comparatively small amount of oil required for the gears lying outside the partition 45a and within the walls of housing 45.

The inner portion of each sleeve 48 is thickened up, thereby increasing its diameter so as to afford plenty of strength for the driven blades 48' and 48a. It will be observed that these two sleeves have no connection with each other, but are journalled over a pilot shaft 51 which extends from the outer parts of bearings 50 and which provides bearing surfaces for independent differential action for 48' and 48a. A spur gear 52 meshes with the teeth 42' of ring gear 42 and drives the fluid impeller 46 around the bearings 50 through bolts 52' at slightly greater than engine speed in a forward direction. By regulating the relative diameters of 42 and 52 any desired ratio of revolutions can be attained. The final drive from the differential drive 46 is by the sleeves 48 through the small pinions 49 on each side to the large spur gears 53 for the right rear road wheel 12 of my vehicle through its drive shaft 9 and 54 a similar large spur gear for the left rear shaft 9.

The integral and preferred power unit shown in Figs. 13 and 14 can be disposed in positions like those shown for parts 2, 3 and 4' of Figs. 1 and 2, for example the engine 2 can remain as placed with the exception that it will be nearer the rear drive shafts 9, the speed altering device at top of Fig. 13 can replace gear box 3 of Fig. 1 and housing 45 of Fig. 13 can replace housing 4' of Fig. 1.

In operation my planetary control and fluid coupling is simpler than any other method for accomplishing similar results, for example assuming the motor 2 is running, drive shaft 35, flywheel 36', clutch 37 will revolve at engine speed, and, providing lever 37a is holding clutch 37 against spring 37' so that clutch 37 does not engage pinion carrier 40 and that the position of lever 37a does not set brake 41 into contact with 40, then sun gear 39 and its pinions 40' will rotate freely without driving ring gear 42. However if lever 37a be moved so as to permit clutch 37 to engage with the carrier 40 then said carrier will drive, through such pinions, ring gear 42 and in turn this gear 42 will drive spur gear 52 at as much above engine speed as 42 is larger in diameter than 52. This means that the casing 46, which contains an appropriate amount of liquid, will revolve at high speed and carry the internal liquid around with it by reason of the impeller blades 46b which line the interior walls 46' of 46 at right angles, substantially, to the insides of such walls 46'. It will be noticed that blades 46b are virtually continuous from adjacent the bolts 52' on one side all the way around the inside walls of 46 around the outer periphery of 48' and 48a to a like termination adjacent bearing 50 on the side opposite bolts 52'. It will be noted that I have provided oil seals 50' and 50a to prevent leakage of the oil from within the housing 46 into the empty or air chamber 45' contained between rotating 46 and partitions 45a.

When the vehicle is at rest on the ground and the motor 2 turning over very slowly the housing 46 may rotate with insufficient velocity to cause the sleeves 48 to move, but as the motor is speeded up the fluid will impinge upon 48' and 48a with increased force causing them to rotate together with their pinions 49 and these in turn will cause spur gears 53 and 54 to drive the shafts 9 in a forward direction for the vehicle wheels 12, and, since the pinions 49 are comparatively small, great power increases can be had in shafts 9. However should the vehicle be turning so that one of its drive wheels describes a larger circle than its corresponding inner circle then the comparatively independent action of 48' and 48a will give a graduated differential action to the drive on both sides. However there are many conditions other than turning which call for an efficient differential action in the drive. For example assume that the right drive wheel of the vehicle is on good traction ground and the left road wheel is on slippery ice. With conventional differential all the power of the motor is routed into the light or left wheel and no power is transmitted to the good traction wheel; consequently the wheel on ice merely rotates at double its proper speed and the vehicle remains helpless to move itself.

For contrast examining the fluid coupling 46 herein disclosed:

The revolving power imparted by the impellers 46b through the liquid inside of 46 is divided equally to driven parts 48' and 48a and consequently to wheel drive shafts 9 for both right and left road wheels 12, but one of these wheels, namely the left one offers less resistance to rotation than the right wheel, consequently it will have more slippage than the good traction wheel in starting the auto into motion and will therefore rotate at higher speed than the good traction wheel, in this case 48a will have higher speed than 48'. But by reason of its higher speed it will aid the impellers 46b in their efforts to rotate the liquid which impinges on 48' and instead of the differential action of the mechanism taking power away from the good traction wheel geared to 53 the lighter running gear 54 and 48a will actually contribute materially to the power of right wheel 12 and the car will move with smooth powerful impulse. During this differential action the bearings 50 take up the differential action without increased friction. The pilot shaft 51 can adjust itself to an intermediate speed between 48' and 48a. To reverse my vehicle I reverse the fluid drive motion and produce the same type of efficient differential action. For example, lever 37a can be moved into a position which removes clutch 37 from driving contact with carrier 40 and sets the brake 41 so as to hold 40 motionless. This leaves the sun gear 39 to rotate ring gear 42 in a reverse direction through pinions 40', but at reduced speed as contrasted with the forward operation of the auto. The follow through of power is the same as outlined for forward speed excepting for the reduced velocity. For the high speed operation forward all of the planetary parts rotate with flywheel action together about bearing 44 and also the casing 46 with all its contents including 48' and 48a revolve together with spur gear 52 in bearings 47. The beneficial cooperation between my liquid coupling and my vertically elongated tire spokes 15 now becomes apparent, for one thing the torque casing 46 has the benefit of the full range of springing of all vehicle parts and is therefore not subject to the jolting it would receive if such housing were partially sprung and partially unsprung as in conventional practice. Such jolting interferes, particularly at low R. P. M. (revolutions per minute) with the efficiency of a fluid drive; also my elongated spokes 15 together with the smooth, even liquid drive, graduated by positive instead of negative differential action and by the torque flexibility of my elongated spokes, which give a graduated brake and clutch action and thus removes all "grab" from both the brakes and the drive clutch.

Matters commonplace to those skilled in the art have not been detailed, but in all cases a clear mechanical method has been indicated to practice the invention; for example, I have left to the mechanic selection of where the flywheel housing and the fluid drive housing 45 are to be joined for easy assembly, but at 46a, Figs. 13 and 14 I have detailed how the union can be made. That the flywheel housing is to be united with the cylinder block and sump of the motor 2 in the usual manner and that the resulting complete unit or motor, planetary control and fluid differential drive with its power step-up are to be fastened to the thwartship and fore and aft bracing 1a and 1b should be clear and also that such bracing detailed in Fig. 15 not only supports the motor 2 and its above listed power transmission devices within the protected, smooth bottom, sill of my vehicle, but such bracing holds in firm alignment the wheel assembly brackets 6 and 7 thus saving the weight, complication and cost of unsprung axle housings, tie-rods, brakes and the like, but eliminating also the vertical space required for steel spring movement between an auto body and its unsprung portions. Thus the new type of elastic spoke tire 11 with its elongated spokes under more initial tension, as to range, than could be attained without the special lateral strength features already described permits a really low cost, high performance auto, with mobility in safety, comfort and economy.

While to economize unnecessary drawing I have taken the liberty to show the clutch shifting for lever 37a in the plan view, it will be understood that for best results it should be turned upward in practice and since countless cams, bell-cranks and push rods hae been associated for many years with controls for planetary gears I have not undertaken to dictate what method shall be used, the essential thing is that my disclosure eliminates the need for the conventional foot clutch "throw-out" pedal and provides, what I submit is a simpler control for speed changes than any heretofore known, i. e. no foot clutch control and only one lever with as little as two positions, forward and rearward, since the fluid drive should idle at low throttle, providing the "stop" condition: However if a neutral position is desired, lever 37a can by cam arrangement (see Patent No. 1,682,297) be provided with a position where its fork keeps clutch 37 out of engagement with pinion carrier 40 and does not set the brake 41 on said carrier. As previously explained under these conditions the sun gear and pinions will rotate without imparting motion to drive housing 46. Water seals, such as shown at 9', 17a and 17c, are understood for all openings to "duck" sub-body. The convenience and comfort afforded the driver and passenger by my indentured wheel housing 26 combines, with folding seat 19 and simple steering gear, to make the most compact vehicle.

What I claim is:

1. In a motor vehicle the combination including: drive wheels, a substantially inflexible body sill supporting a united motor and differential fluid drive, wheel bearing brackets rigid with said sill, flexible tire tread hoops, a plurality of elastic tension means, each said means of greater length than the radius of the said wheels and adapted to carry all of the vehicle weights to the upper portions of said hoops, separate shafts forming connections between the said fluid drive and the said drive wheels adapted to deliver most power to whichever of said wheels offers the greater resistance to rotation, and means intermediate said motor and fluid drive to reverse said fluid drive, whereby all parts of the vehicle partake equally of a down range of springing from static load within the limits of said tension means and graduated fluid drive differential speeds are had for the said drive wheels.

2. A motor vehicle including a box-like body sill, axle means associated with said sill and held against relative vertical movement with respect thereto, driving and steering road wheels mounted upon said axle means, an individual set of flexible tread hoops and elastic spokes for each individual wheel, each set of spokes provided with comparatively small inwardly disposed lugs and larger outwardly disposed lugs affixed to each set of tread hoops and yieldable elastically through a range of not less than five inches, whereby all portions of said vehicle are sprung with an approximate five inch down movement range from static load position and afforded lateral strength.

3. The combination in a motor vehicle of: flexible tire treads, two differential fluid drives, a body having a box-like sill section, bearings carried within said section and immovable with respect thereto, a pair of drive shafts held by said bearings in substantially horizontal position, a pair of road wheels one driven by one said shaft and fluid drive and the other driven by the other shaft and fluid drive, the said fluid drives supported by and rigid with said sill section and elastic means of greater length than the radius of the said wheels transferring the vehicle weight from the said wheels to the said tire treads and means ahead of said fluid drives operable by the vehicle driver to reverse the direction of rotation of said fluid drives.

4. In a motor vehicle combination: including an engine and a body having a box-like sill, drive wheels, flexible tire treads surrounding and spaced radially apart from said wheels, fluid couplings mounted rigid with said sill and reversing means located ahead of said fluid drive, a torque multiplier for each coupling, each coupling arranged to drive one of said wheels through its associated torque multiplier, and elastic spokes connecting each wheel with its surrounding tire tread, the radial length of each spoke exceeding the radius of its associated wheel, whereby a range of down movement from static load greater than the radius of the wheel is afforded for springing the vehicle and graduating the fluid coupling delivery of power to said drive wheels.

5. In combination with the steering wheels of an automobile, a body sill section, a floor portion carried by said sill section and extending between points adjacent the inside centers of the steering wheels, a steering wheel bracket attached to each end of the sill section, a wheel housing extending forwardly and rearwardly of said sill section at its ends and having its center indentured outwardly adjacent said brackets for the accommodation of the steering angles of said wheels, said floor extending outwardly beyond the turning angles of the wheels and into the indentured center, whereby the said floor of the automobile, between the wheels, is materially increased and the wheel brackets are curtailed.

6. In combination with the steering wheels of an automobile, a box-like body sill member, a wheel housing with an indentured center, body floor portions supported by said member and extending outwardly beyond the turning angles of the wheels and into the said indentured center, whereby the said floor of the automobile is materially increased between the wheels, and a steering kingpin fixed to the outer extremities of said sill member.

7. In combination in a motor vehicle, a pair of drive wheel brackets one for each wheel, a pair of flexible tire treads one surrounding each wheel, a box-like body portion rigid with said brackets, an assembly including: an engine and two fluid drives and two speed reduction devices rigid with said body portion, a pair of drive shafts one connecting one fluid drive and speed reduction device to one wheel and the other connecting the other fluid drive and speed reduction device to the other wheel, a single reversing means ahead of both fluid drives and elastic means springing said wheels and driving parts supported by said portion with equal vertical range of movement from the outer margins of said flexible treads, whereby the torque from each fluid drive will be delivered to said treads graduated by said elastic means.

References Cited in the file of this patent

UNITED STATES PATENTS

| | | |
|---|---|---|
| 1,066,954 | Saunderson | July 8, 1913 |
| 1,146,314 | Dugger | July 13, 1915 |
| 1,717,548 | Berg | June 18, 1929 |
| 1,759,280 | Romaniuk | May 20, 1930 |
| 1,989,995 | Martin | Feb. 5, 1935 |
| 2,010,368 | Martin | Aug. 6, 1935 |
| 2,026,244 | Myard | Dec. 31, 1935 |
| 2,030,441 | Ganz | Feb. 11, 1936 |
| 2,106,843 | Hahn | Feb. 1, 1938 |
| 2,282,638 | Boyer | May 12, 1942 |
| 2,283,274 | Martin | May 19, 1942 |
| 2,287,498 | Scofield | June 23, 1942 |
| 2,298,142 | Martin | Oct. 6, 1942 |
| 2,335,544 | Schnetzer | Nov. 30, 1943 |
| 2,400,132 | Porter | May 14, 1946 |
| 2,441,703 | Irwin | May 18, 1948 |
| 2,449,320 | Raimondi | Sept. 14, 1948 |
| 2,458,130 | Andreau | Jan. 4, 1949 |
| 2,466,236 | Hecker | Apr. 5, 1949 |
| 2,468,107 | Powell | Apr. 26, 1949 |
| 2,497,857 | Benson | Feb. 21, 1950 |
| 2,563,731 | Masterson | Aug. 7, 1951 |

FOREIGN PATENTS

| | | |
|---|---|---|
| 261,860 | Great Britain | Dec. 9, 1926 |